United States Patent [19]

Rudolph et al.

[11] 4,161,780

[45] Jul. 17, 1979

[54] SPIN RATE TIMING SYSTEM

[75] Inventors: Louis R. Rudolph, Annandale, Va.; Woodrow W. Ewen, II, Silver Spring, Md.

[73] Assignee: The United States of America as represented by the Secretary of the Navy, Washington, D.C.

[21] Appl. No.: 918,256

[22] Filed: Jun. 23, 1978

[51] Int. Cl.$^2$ .......................... G06F 15/20; B64G 1/20
[52] U.S. Cl. ..................................... 364/434; 244/169; 244/171
[58] Field of Search ................ 364/434; 244/164, 169, 244/171

[56] References Cited

U.S. PATENT DOCUMENTS

| | | |
|---|---|---|
| 3,899,928 | 8/1975 | Fraiture ........................... 244/171 X |
| 3,944,172 | 3/1976 | Becker ............................. 364/434 X |
| 3,977,633 | 8/1976 | Keigler et al. ...................... 244/169 |
| 4,012,018 | 3/1977 | Lorell et al. ..................... 244/171 X |

Primary Examiner—Jerry Smith
Attorney, Agent, or Firm—R. S. Sciascia; Philip Schneider; William C. Daubenspeck

[57] ABSTRACT

Apparatus for use in determining the orientation of a spinning spacecraft and for controlling the attitude motion thereof. In response to commands from an external processor, the apparatus enables a selected thruster at a commanded time delay after a solar-or earth-sensor reference pulse and fires the thruster a commanded number of times. The time difference between various sensor inputs is measured to determine spin rate and other data which is used by the external processor in calculating the firing sequence of the thrusters.

2 Claims, 1 Drawing Figure

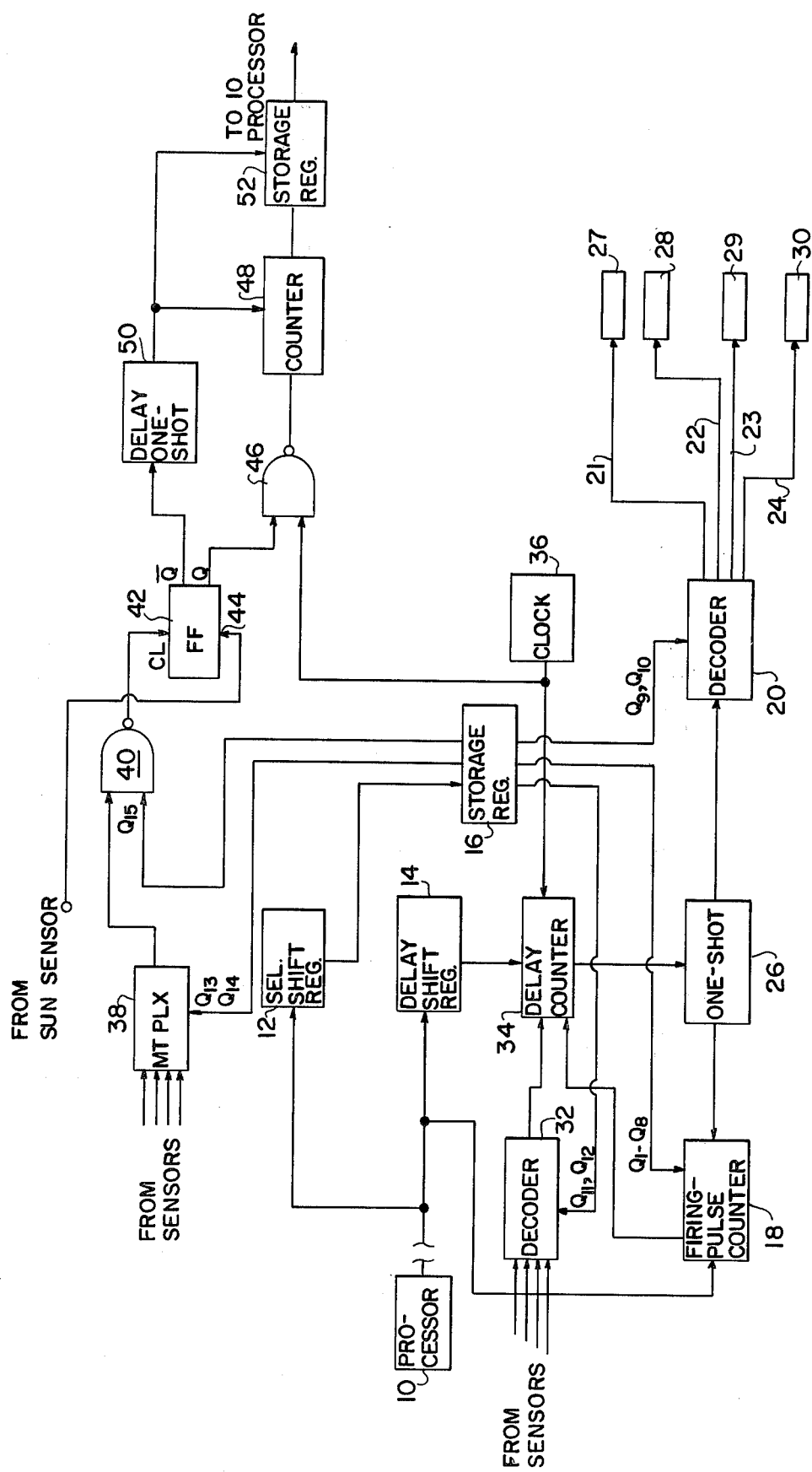

SPIN RATE TIMING SYSTEM

BACKGROUND OF THE INVENTION

The present invention relates in general to the control of spacecraft and, more particularly to apparatus for use in controlling the orientation of spin-stabilized spacecraft.

It is often necessary to determine and/or modify the attitude of a spacecraft while it is in orbit about a planetary body. For example, it may be necessary to precisely determine the spacecraft's orientation in order that it may be accelerated to a desired velocity or placed in a desired orbit by the application of thrust in the proper direction. A particular equipment such as a communications antenna or a solar cell may require a specific orientation for most efficient operation.

One technique which has been commonly employed for adjusting the orientation of a spacecraft is the use of thrusters mounted on the perphery of the vehicle. Typically the spacecraft is spinning about a spin-axis and is non-spinning with respect to the two other axes. In this case, it is possible to use four thrusters to adjust the orientation of the spin-axis in any direction. In order to fire a thruster in the appropriate direction to secure the desired orientation, it is necessary to accurately determine the spacecraft's attitude and spin rate. Knowing the attitude and spin rate it is possible to correct the orientation of the vehicle by applying thrust at the right angular position along the spin axis. This requires exact timing of thruster firing.

SUMMARY OF THE INVENTION

The present invention provides delayed firing of thruster jets to correct or adjust the attitude of a spinning spacecraft in response to instruction words from an associated processor. The delay is referenced to a sun or an earth sensor. The present invention also measures time difference between various sensor inputs to determine the spin rate and other data necessary to determine the delayed firing sequence to achieve the desired orientation of the spacecraft.

BRIEF DESCRIPTION OF THE DRAWING

The FIGURE is a schematic block diagram illustrating the present invention.

DESCRIPTION OF THE PREFERRED EMBODIMENT

Referring to FIG. 1, the spin-rate timing system (SRT) is under the control of an external processor 10 such as a computer located at a ground station or a microprocessor located on the spacecraft. The SRT has two main functions. The first is to provide data on the spacecraft orientation from onboard sensors to the processor 10 in response to instructions from the processor. The processor uses this data from the spacecraft to calculate the present orientation (i.e., roll, pitch, yaw, and spin rate) of the spacecraft, and determines the proper firing sequence to reorient the spacecraft as desired. The second function of the SRT is to control the firing of thrusters in response to instructions from the processor 10. The SRT receives a plurality of sensor inputs from various sources on the spacecraft such as infrared earth sensors and solar sensors. Typically these sensors will be mounted normal to the spin-axis and will produce one pulse for each revolution of the spacecraft.

The SRT receives two command words, a select word and a delay word, from the processor 10. The select word and the delay word, each containing 16 serial bits of data ($Q_1$-$Q_{16}$) are clocked into a select shift register 12 and a delay shift register 14, respectively. The select word is immediately transferred from the select shift register 12 as parallel data bits to a storage register 16 where the data is stored until a new select word is received. The select word contains instructions associated with both data collection and the firing control functions of the SRT. Considering first the firing control function, the first eight bits $Q_1$-$Q_8$ are an eight-bit binary number (decimal 0-255) which determines the number of times a designated thruster will be fired. This count (bits $Q_1$-$Q_8$) is coupled to a firing-pulse counter 18 and is loaded into the counter 18 when a delay word is received by the delay shift register 14. It is therefore not necessary to enter a select word each time a delay word is sent unless there is a change in the select word.

In this embodiment, the SRC is intended to control four thrusters. Therefore two bits, $Q_9$ and $Q_{10}$, of the select word are used to control thruster selection. These bits are coupled from the storage register 16 to a decoder 20 which selects one of four outputs 21-24 depending on the state of $Q_9$ and $Q_{10}$. The decoder 20 also receives a trigger pulse from a one-shot multivibrator 26 which is triggered at a time determined by the delay word as will be explained presently. The trigger pulse is coupled by the selected output 21-24 to power gates associated with pulse valves 27-30 which in turn control the thrust.

Bits $Q_{11}$ and $Q_{12}$ of the select word are coupled from the storage register 16 to a decoder 32 which selects one of four sensor signals (for example, an infrared earth sensor or a solar sensor) for input to a delay counter 34. The delay counter 34 is also coupled to the output data lines of the delay shift register 14. The first pulse from the selected sensor will load the delay word which is present in the delay shift register 14 into the delay counter 34. The counter then counts down to zero at a rate determined by clock 36. When the count in the delay counter 34 reaches zero, it triggers the one-shot multivibrator 26, the output of which is coupled to decoder 20 as previously explained. The output of the one-shot 26 is also coupled to the firing-pulse counter 18 so that the counter is stepped down by one count. The delay word is reloaded into the delay counter 34 on the next sensor pulse (as selected at 32) and the sequence continues until the firing-pulse counter 18 registers zero. The SRT firing functions stop and the system waits for a new delay word which will reload the firing-pulse counter 18 with the count (bits $Q_1$-$Q_8$ of the select word from the select storage register 16).

Considering now the data collection functions of the SRT system, bits $Q_{13}$ and $Q_{14}$ of the select word are coupled to the multiplexer 38 which selects one of four infrared sensors as inputs to the system. The output (of multiplexer 38) which has been selected and bit $Q_{15}$ from the select word are combined in an AND function at a NAND gate 40. The output of the NAND gate 40 is applied to the clear input of a spin-rate flip-flop 42. When $Q_{15}$ is not set, the flip-flop 42 is in the toggle mode; that is, pulses applied to the input 44 cause it to alternate between high and low outputs. The output of a solar sensor is applied to the input 44 and the result is a square wave having a half period equal to the spin-rate period. The $\overline{Q}$ output of the flip-flop 42 is gated with the clock pulse from 36 in NAND gate 46 to provide pulses to a counter 48 during the "one" state of the flip-flop. The Q output of the flip-flop 42 is applied to a delay one-shot 50 which transfers the data in counter 48 to a storage register 52 and then resets the counter 48 to zero. The output of the storage register 52 which is the time between solar pulses is coupled to the processor 10.

When bit $Q_{15}$ is set, the flip-flop 42 is toggled by the solar pulses at input 44, but is cleared by the pulses from the infrared sensor (selected by bits $Q_{13}$ and $Q_{14}$) which are coupled to the clear input via NAND gate 40. The output of the flip-flop 42 is triggered to a "one" state by the sun sensor pulse and reset to a "zero" state by the selected earth pulse. As with the spin-rate measurement, the counter 48 is clocked during the "one" state of the flip-flop. The output of the storage register 52 in this case is the time between solar and earth pulses.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. Apparatus for use in controlling the attitude of a spinning spacecraft, said apparatus receiving serial data words from an external processor and pulse inputs from sensors disposed on the spacecraft and transmitting data to said processor and signals to control thruster jets on said spacecraft, said apparatus comprising:
    a select shift register having its input coupled to said processor for receiving a select data word;
    a delay shift register having its input coupled to said processor for receiving a delay data word;
    a storage register having its data input coupled to the data output of said selected shift register for storing said select data word;
    a delay counter having its input coupled to the data output of said delay shift register;
    a clock coupled to said delay counter for stepping down the count in said counter;
    a first decoder coupled to the data output of said storage register, said first decoder receiving at least two data bits from said storage register to direct a signal received at its input to one of a plurality of outputs, said outputs controlling said thruster jets;
    a firing pulse counter coupled to the data output of said storage register, said firing pulse counter receiving a plurality of data bits from said storage register to enter an initial count in said counter, the delay data word loading the data in said counter;
    a second decoder coupled to the data output of said storage register, said second decoder receiving at least two data bits from said storage register to select one of a plurality of sensor inputs as the output of said decoder; said output being coupled to said delay counter to load the delay word in said delay shift register into said delay counter; and
    a one-shot multivibrator coupled to said delay counter, said multivibrator being triggered when the count in said delay counter reaches zero, the output of said multivibrator being coupled to said firing-pulse counter to step down the count in said firing-pulse counter and being coupled to the input of said first decoder.

2. The apparatus as recited in claim 1 further comprising:
    a multiplexer coupled to the data output of said storage register, said multiplexer receiving at least two data bits from said storage register to select one of a plurality of sensor inputs as the output of said multiplexer;
    a first NAND gate having a first input coupled to the output of said multiplexer and a second input coupled to the data output of said storage register for receiving a data bit from said storage register;
    a spin-rate flip-flop having its clear input coupled to the output of said NAND gate and a toggle input coupled to a sensor input;
    a second NAND gate having a first input coupled to the Q output of said flip-flop and its second input coupled to said clock;
    a third counter having its input coupled to the output of said second NAND gate;
    a second storage register coupled to the data output of said third counter, the output of said second storage register being coupled to said processor; and
    a delay device having its input coupled to the $\overline{Q}$ output of said flip-flop, the output of said delay device loading the count in said third counter into said second storage register and resetting said third counter to zero.

* * * * *